(12) United States Patent
Hartwich et al.

(10) Patent No.: US 12,263,487 B2
(45) Date of Patent: Apr. 1, 2025

(54) REFRACTORY LINING DESIGN FOR MAGNETIC SEPARATION

(71) Applicant: HarbisonWalker International Holdings, Inc., Moon Township, PA (US)

(72) Inventors: David Hartwich, Bethel Park, PA (US); Joshua Sayre, Pittsburgh, PA (US)

(73) Assignee: HarbisonWalker International Holdings, Inc., Pittsburgh, PA (US)

( * ) Notice: Subject to any disclaimer, the term of this patent is extended or adjusted under 35 U.S.C. 154(b) by 0 days.

(21) Appl. No.: 18/211,324

(22) Filed: Jun. 19, 2023

(65) Prior Publication Data

US 2024/0416360 A1 Dec. 19, 2024

(51) Int. Cl.
*B03C 1/023* (2006.01)
*B03C 1/18* (2006.01)
(Continued)

(52) U.S. Cl.
CPC ............ *B03C 1/023* (2013.01); *B03C 1/18* (2013.01); *C04B 14/34* (2013.01); *C04B 14/48* (2013.01);
(Continued)

(58) Field of Classification Search
CPC ....... B03C 1/023; B03C 1/18; B03C 2201/20; C04B 14/34; C04B 14/48;
(Continued)

(56) References Cited

U.S. PATENT DOCUMENTS

| 1,924,311 A | 8/1933 | Frey |
| 10,717,675 B2 | 7/2020 | Bugajski |

(Continued)

FOREIGN PATENT DOCUMENTS

| CN | 101353260 A | 1/2009 |
| CN | 104193373 A | 12/2014 |

(Continued)

OTHER PUBLICATIONS

Ovčačík, F. et al., (2015) *Technology of refractory materials and heat insulating materials*, https://allindustrialtraining.com/wp-content/uploads/2020/10/Refractory-and-Thermal-Insulating-Ceramics-Materials.pdf , Printout Date: Dec. 16, 2022.

*Primary Examiner* — Terrell H Matthews
*Assistant Examiner* — Kalyanavenkateshware Kumar
(74) *Attorney, Agent, or Firm* — Renner, Otto, Boisselle & Sklar, LLP

(57) ABSTRACT

A device and method of reclaiming refractory material from a lining of a refractory includes assembling a first refractory component of the lining with a first refractory product, and assembling a second refractory component of the working lining with a second refractory product different from the first refractory product, the second refractory product including magnetic material dispersed therein. Upon the lining reaching a service life, the lining is demolished to produce a mixture of the first refractory component pieces and the second refractory component pieces. Magnetic separation is performed on the mixture to separate the second refractory component pieces from the first refractory component pieces.

11 Claims, 5 Drawing Sheets

(51) Int. Cl.
  *C04B 14/34*    (2006.01)
  *C04B 14/48*    (2006.01)
  *C04B 35/622*   (2006.01)
  *C04B 35/76*    (2006.01)
  *C04B 111/28*   (2006.01)

(52) U.S. Cl.
  CPC ........ *C04B 35/62204* (2013.01); *C04B 35/76* (2013.01); *B03C 2201/20* (2013.01); *C04B 2111/28* (2013.01); *C04B 2235/9676* (2013.01)

(58) Field of Classification Search
  CPC .............. C04B 35/62204; C04B 35/76; C04B 2111/28; C04B 2235/9676
  See application file for complete search history.

(56) References Cited

U.S. PATENT DOCUMENTS

2014/0084525 A1* 3/2014 Tomala ................. C04B 35/532
                                                         264/434
2019/0241992 A1    8/2019 Fasolini et al.

FOREIGN PATENT DOCUMENTS

| CN | 106994388 A  |   | 8/2017 |
|----|--------------|---|--------|
| JP | 3704301 B2   |   | 7/2005 |
| JP | 4475635 B2   |   | 3/2010 |
| JP | 2013-193929 A |  | 9/2013 |
| JP | 2013036103   | * | 8/2015 |
| KR | 10-0508511 B1 |  | 8/2005 |

* cited by examiner

REFRACTORY LINING DESIGN FOR MAGNETIC SEPARATION

FIELD OF THE INVENTION

The present invention relates generally to refractory linings, and more particularly, to a magnetic refractory lining component and a method for sorting, recycling, and reuse of spent refractory linings using such magnetic refractory lining component.

BACKGROUND OF THE INVENTION

The assembly of refractory linings for steel ladles aims for optimum service life during making or refining liquid steel. The linings are designed from multiple components with variable compositions to reach that goal. For example, it is typical that a steel ladle lining for making aluminum killed steels would have magnesia-carbon slag lines to protect against slag corrosion; magnesia-carbon, or alumina-magnesia-carbon sidewalls to protect against steel erosion; magnesia-carbon, or alumina-magnesia-carbon, or high alumina concrete bottoms to protect against steel impact; magnesia-carbon, or alumina-magnesia carbon, or alumina carbon, or high alumina brick or high alumina concrete retaining lip rings to assure lining compression; and typically, high alumina refractory concrete well blocks and pocket blocks within the ladle bottoms to optimize the ladle life for thermal shock resistance and extend the time between repairs. For silicon killed steel, the majority of the steel lining is built from dolomitic brick, or a combination of dolomitic and magnesia-carbon bricks. Even though the refractory qualities in the ladle for silicon killed steel are less variable, there are designs which would incorporate some of the portions of the lining to be constructed from high alumina refractory concretes. This would be predominantly the case of well and pocket blocks, lip rings, or even the ladle bottoms. Such modifications of the refractory linings again aim at optimizing the life of the steel ladle for slag corrosion, steel erosion, liquid steel impact, optimum repair cycles, or optimum thermal shock resistance.

Such complex refractory linings, especially when high alumina refractory concretes are part of the design, pose a problem when the spent linings are being demolished and sorted to be potentially further recycled into new refractory products. During the recycling and reuse programs the remnants of the high alumina refractory concretes act as contaminants. They are difficult to remove even if a sequential lining demolition (i.e., stepwise disassembly of the spent refractory lining and sorting of the discrete refractory components into separate categories) is applied. The stepwise disassembly of the working steel ladle lining is typically characterized by a first step where the lip ring is removed and segregated; a second step where the slag line is removed and segregated, a third step where remaining sidewall is removed and segregated, a fourth step where the well block and pocket blocks are removed and segregated, and a fifth step where the working bottom is removed and segregated. There may be some modifications to this stepwise disassembly, when the blocks and bottoms are removed and segregated first, followed by disassembly of the lip ring and the rest of the working lining. Regardless of the sequence for the disassembly, this process is time consuming, labor and equipment intensive. Moreover, the spent refractory linings many times are bonded, or fused together and the differentiation between the high refractory concretes and other components of the lining is difficult. In addition, such differentiation is only visual, and requires experienced demolishing operators with extensive training requirements, which is very difficult to achieve in the steel mill conditions and labor environment.

Consequently, the current steel ladle demolishing practices are not effective for proper sorting, recycling, and reuse of spent refractory linings.

SUMMARY OF THE INVENTION

The present invention provides a magnetic refractory product, a metallurgical vessel formed from such magnetic refractory product, and a method for recycling refractory components from a metallurgical vessel formed at least in part from the magnetic refractory product, where magnetic separation is utilized to sort different types of refractory components from one another.

More particularly, a refractory product in accordance with the invention is formed from refractory materials with an inclusion of magnetic material, and this refractory product is used to form refractory components of a refractory lining, where such refractory product retains magnetic properties after exposure to a metallurgical process. Upon the refractory lining reaching its service life, the lining is demolished to produce a mixture of refractory component pieces, and the mixture then is subjected to a magnetic separation process to separate different types of refractory components from one another.

According to oine aspect of the invention, a method of reclaiming refractory material from a working lining of a refractory vessel includes: assembling a first refractory component of the lining with a first non-magnetic refractory product; assembling a second refractory component of the lining with a second refractory product different from the first refractory product, wherein the second refractory product includes magnetic material dispersed therein; upon the lining reaching a service life, demolishing the lining to produce a mixture of first refractory component pieces and second refractory component pieces; and performing magnetic separation on the mixture to separate the second refractory component pieces from the first refractory component pieces.

In one embodiment, performing magnetic separation comprises subjecting the mixture to a magnetic field, whereby the magnetic field attracts the magnetic material and causes the second refractory component pieces to be drawn away from the first refractory component pieces.

In one embodiment, the method includes prior to assembling the second refractory component, pre-mixing the magnetic material with a refractory material of the second refractory product.

In one embodiment, the method includes prior to demolishing the lining, subjecting the lining to a metal-making process.

In one embodiment, assembling includes using a second refractory product having magnetic material in the form of fibers, needles or spheres.

In one embodiment, assembling includes using a second refractory product having magnetic material that has a length, width and height less than one quarter inch, or has a diameter less than one quarter inch.

In one embodiment, assembling includes using a second refractory product having magnetic material configured to retain magnetic properties after exposure to a metallurgical process.

In one embodiment, assembling includes using a second refractory product having a concentration of magnetic material relative to refractory materials of the second refractory product that is between 1-5 percent by weight.

In one embodiment, demolishing the lining comprises demolishing the lining to produce first and second refractory component pieces that are greater than one quarter inch in at least one of a length, width, height, or diameter.

In one embodiment, the method includes subsequent to performing magnetic separation, liberating the magnetic material from refractory aggregate of the second refractory component pieces and subjecting such blend to secondary magnetic separation.

In one embodiment, liberating includes crushing the second refractory component pieces to a size less than one quarter inch in at least one of a length, width, height, or diameter.

According to another aspect of the invention, a refractory product includes: a refractory material; and a magnetic material dispersed within the refractory material, the magnetic material indicative of a compositional characteristic of the refractory material.

In one embodiment, the magnetic material is selected based on the magnetic material being capable of maintaining magnetic properties after exposure to a metal-making process.

In one embodiment, the magnetic material comprises at least one of fibers, needles or spheres.

In one embodiment, the magnetic material has a length, width and height less than one quarter inch, or has a diameter less than one quarter inch.

In one embodiment, a concentration of the magnetic material relative to refractory materials of the refractory product is between 1-5 percent by weight.

In one embodiment, the refractory product includes a binder material mixed with the refractory material, wherein the magnetic material is dispersed within the binder material.

In one embodiment, the binder material comprises at least one of calcium aluminate cement, colloidal silica, colloidal alumina, colloidal magnesia, other colloidal oxides or hydroxides, hydratable alumina, phenolic resin, pitch, phosphate, starch, sugar, or sulfonate.

According to another aspect of the invention, a brick refractory product or monolithic refractory product includes the refractory product described herein.

Examples of the specific embodiments are illustrated in the accompanying drawings. While the invention will be described in conjunction with these specific embodiments, it will be understood that it is not intended to limit the invention to such specific embodiments. On the contrary, it is intended to cover alternatives, modifications, and equivalents as may be included within the spirit and scope of the invention. In the following description, numerous specific details are set forth in order to provide a thorough understanding of the present invention. The present invention may be practiced without some or all of these specific details. In other instances, well-known process operations have not been described in details so as to not unnecessarily obscure the present invention.

BRIEF DESCRIPTION OF THE DRAWINGS

The invention may take physical form in certain parts and arrangement of parts, a preferred embodiment of which will be described in detail in the specification and illustrated in the accompanying drawings which form a part hereof, and wherein.

DETAILED DESCRIPTION OF PREFERRED EMBODIMENT

Figure 1A:
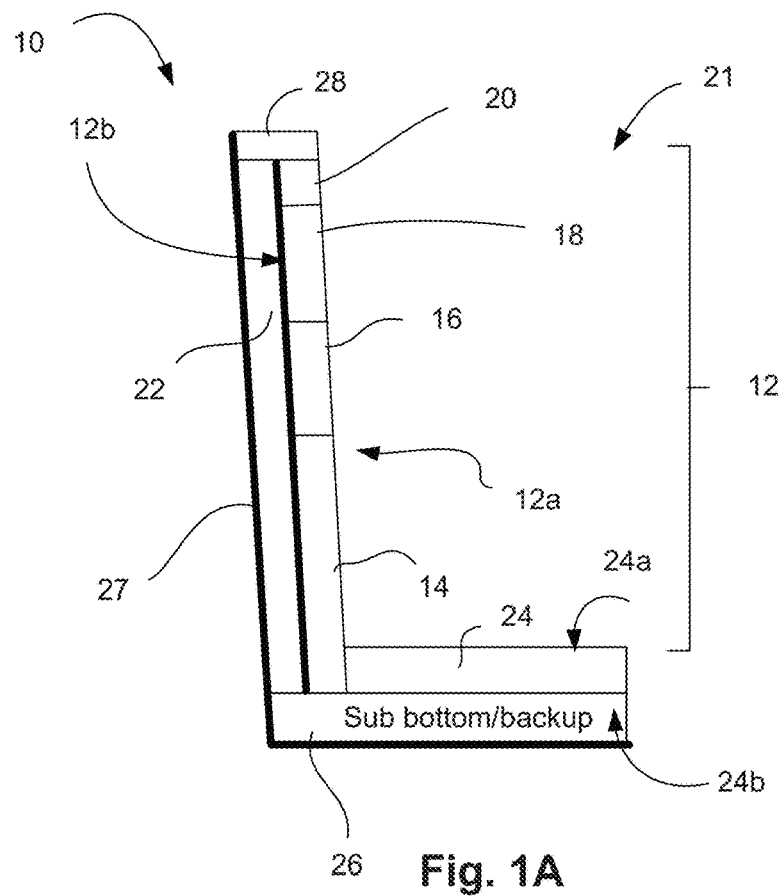
FIGS. 1A and 1B are simple schematic views of exemplary metallurgical vessels.

Various aspects now will be described more fully hereinafter. Such aspects may, however, be embodied in many different forms and should not be construed as limited to the embodiments set forth herein; rather, these embodiments are provided so that this disclosure will be thorough and complete, and will fully convey its scope to those skilled in the art.

The word "about" when immediately preceding a numerical value means a range of plus or minus 10% of that value, e.g., "about 50" means 45 to 55, "about 25,000" means 22,500 to 27,500, etc., unless the context of the disclosure indicates otherwise, or is inconsistent with such an interpretation. For example, in a list of numerical values such as "about 49, about 50, about 55, "about 50" means a range extending to less than half the interval(s) between the preceding and subsequent values, e.g., more than 49.5 to less than 52.5. Furthermore, the phrases "less than about" a value or "greater than about" a value should be understood in view of the definition of the term "about" provided herein.

The term "refractory material" refers to a mixture of one or more primarily inorganic nonmetal materials, such as fused magnesia, sintered magnesia, dolomite, magnesia-alumina spinel, calcined, tabular or white fuse alumina, calcined bauxite, various forms of carbonaceous materials, various forms of mullite-based raw materials, other aluminosilicate materials, and recycled spent refractories, optionally a mixture of refractory component(s) and a magnetic material. Such refractory material may also include a binder and/or an antioxidant to be used for a formed or unformed refractory product.

The term "magnetic material" refers to a material that may be mixed with refractory material for identification purposes at a later time, where the magnetic material has magnetic properties that are retained at least in part (at least 10% retention and preferably at least 90% retention of the original magnetic properties) after the "magnetic material" has been subjected to a metallurgical process.

The term "refractory component" refers to a discrete portion (e.g., section) of the refractory lining of a vessel. For example, a first refractory component may form the barrel region of a ladle and a second, different, refractory component may form the floor region of the ladle. Refractory components are formed from refractory material and, as described in further detail below, may include magnetic material that can be used for identification purposes. The added magnetic material does not significantly decrease the purity of the refractory material that forms the refractory component and may improve other properties of the refractory material.

The term "refractory product" refers to a refractory material after any and all manufacturing treatment and finishing (e.g., adding magnetic material, forming, curing, tempering, firing, packaging, etc.); the end product, ready for installation into a vessel and use, e.g., for steel production, other metal-making, non-metal making, chemical-making, gas-making, heat-making, or for high-temperature reactions, and the like. Refractory products are characterized by a high melting point, and are typically resistant to decomposition by heat, pressure, or chemical attack, and retain strength and form at high temperatures.

In accordance with the present invention, a magnetic material is included into the composition of one or more refractory materials during the manufacturing process of a refractory product (i.e., an end product for the refractory components of a lining of a metallurgical vessel), the magnetic material indicative of a compositional characteristic of a refractory component (e.g., a type of refractory component) formed from such mixture of magnetic material and refractory material. The magnetic material is designed into the refractory product so as not to diminish the high temperature properties of the refractory product, while providing the ability to retain magnetic properties for later identification of the refractory product's source refractory material and to enable closed loop recycling of the refractory product after demolition. Preferably, the concentration of the magnetic material relative to the refractory material is between 1 percent and 5 percent by weight.

The refractory product with the magnetic material can be used to form refractory component of linings of a metallurgical vessel. More importantly, when the refractory lining formed from such refractory product has reached the end of its service life and is demolished to produce a mixture of different refractory component pieces and impurities, the magnetic material can be used to identify and sort one type of refractory component pieces from other types of refractory component pieces and/or impurities for reclamation. In this regard, and as discussed in further detail below, a magnetic separation process can be utilized to separate one type of refractory component pieces from the other types of refractory component pieces and/or impurities (and thus separating one type of refractory component from another type of refractory components).

Referring to FIG. 1A, illustrated is an exemplary lining construction for a metallurgical vessel 10 to which principles of the invention may be applied. The lining construction includes a working lining 12 having a barrel region 14, a transition region 16, a slag line region 18 and a freeboard region 20. As shown in FIG. 1A, the transition region 16 is between the barrel region 14 and the slag line region 18, and the slag line region 18 is between the transition region 16 and the freeboard region 20. The working lining 12 has a first working lining side 12a (also referred to as the hot-face) and a second working lining side 12b (also referred to as the cold-face) opposite the first working lining side 12a, where the first working lining side 12a faces an inner molten metal and molten slag holding region 21 of the metallurgical vessel 10.

The lining construction further includes a backup lining 22 that is adjacent to and behind the working lining 12, and a bottom lining 24 is arranged adjacent to the barrel region 14. The bottom lining 24 includes a first bottom lining side 24a (also referred to as the hot-face) and a second bottom lining side 24b (also referred to as the cold-face) opposite the first bottom lining side 24a, where the first bottom lining side 24a faces the inner molten metal holding region 21. A sub-bottom lining 26 is disposed under and in contact with the second bottom lining side 24b. Arranged along a top portion of the lining construction is a flange 28 (also referred to as a lip ring), the flange 28 being distal from the bottom lining 24 and adjacent to a top edge surface of the working lining 12 (in particular the freeboard 20) and the backup lining 22. The sub-bottom lining 26 and backup lining 22 are supported by a steel structure 27 (also referred to as a ladle shell) that defines the outer dimensions of the vessel. One or more of the working lining 12 (including its sub-sections), backup lining 22, bottom lining 24 and/or sub-bottom lining 24b may be formed from refractory products that include magnetic materials as described herein. The freeboard, slag line, transition zone, barrel, flange (lip ring), working bottom, or any other portions of the working refractory lining are to be considered the individual refractory lining components.

Figure 1B:
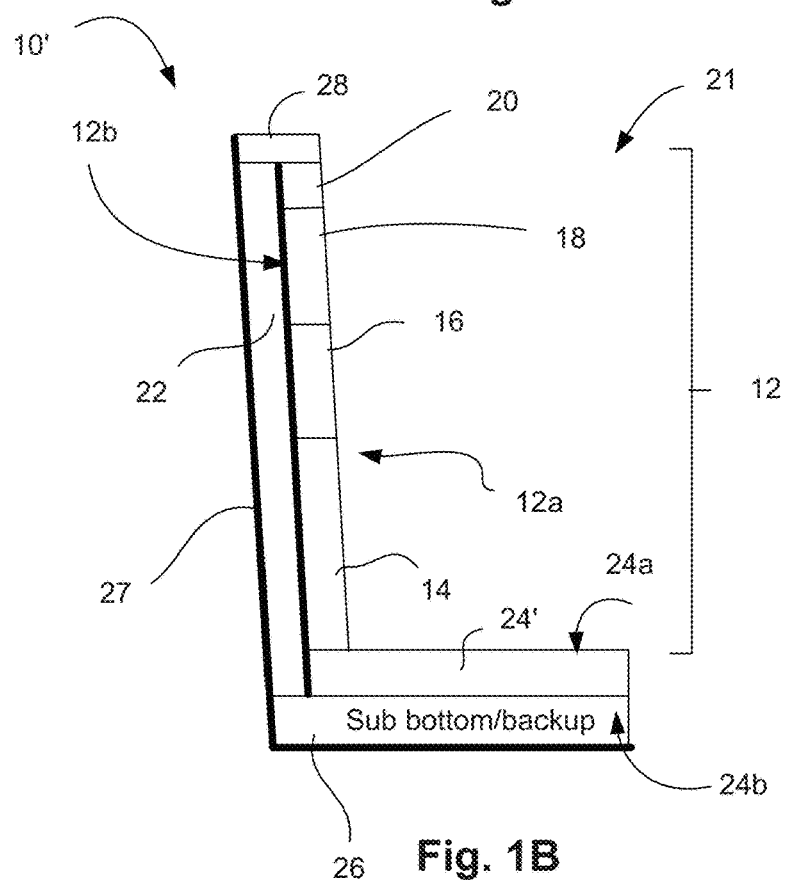

Briefly referring to FIG. 1B, illustrated is another exemplary lining construction for a metallurgical vessel 10' to which principles of the invention may be applied. The metallurgical vessel 10' of FIG. 1B is substantially the same as the vessel 10 of FIG. 1A, but has an "under barrel" bottom, also called full bottom, configuration. As can be seen in FIG. 1B, the working lining 12 is arranged over the bottom lining 24', which is in contrast to the vessel 10 of FIG. 1A in which the working lining 12 is adjacent to but not over the bottom lining 24.

Figure 2:
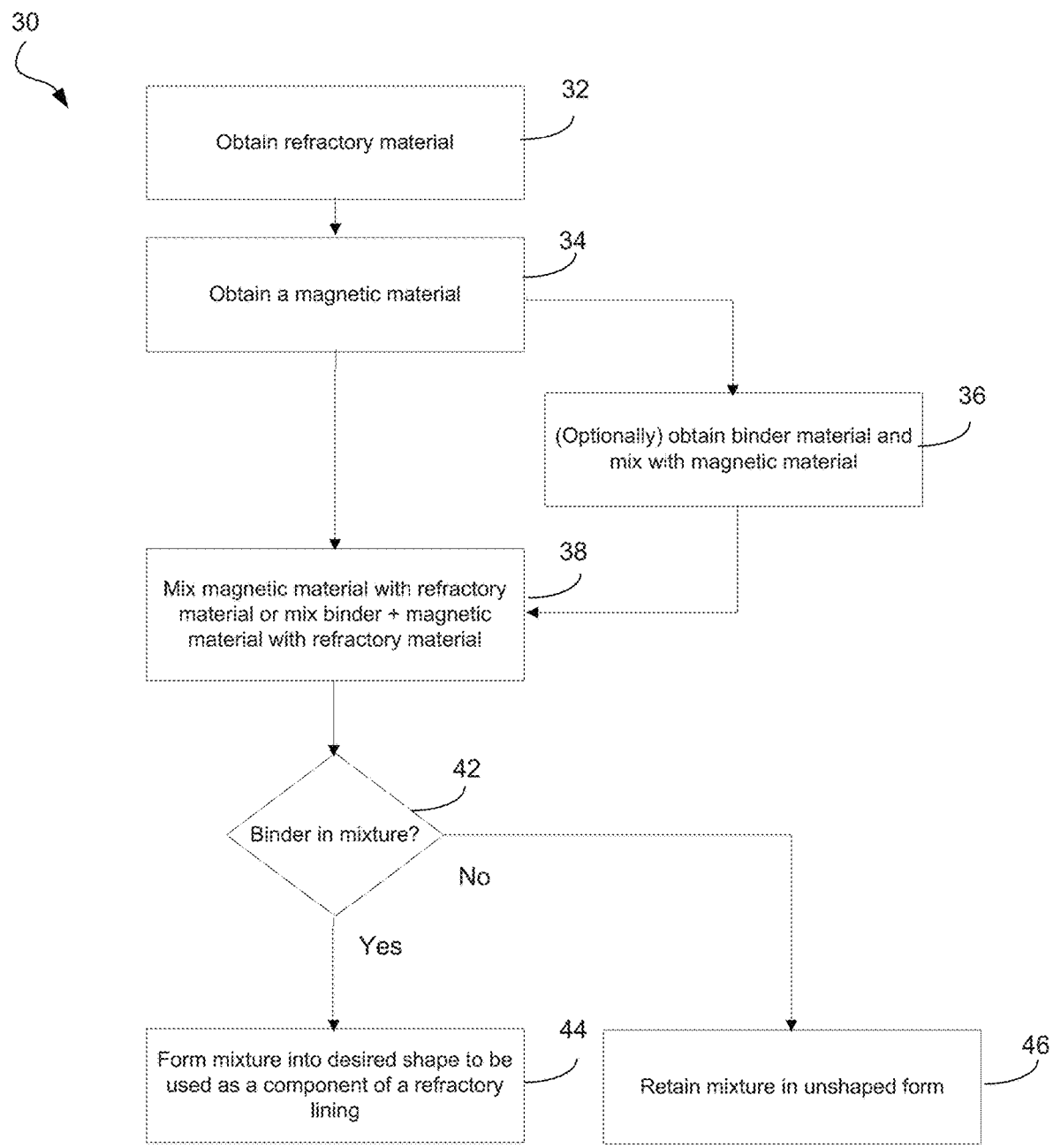
FIG. 2 is a flow chart showing the steps of an exemplary method for creating refractory product having magnetic properties in accordance with the invention.

Referring now to FIG. 2, illustrated is a flow chart disclosing an exemplary method 30 for forming a refractory product with a magnetic material in accordance with the invention. Beginning at step 32, one or more refractory materials are obtained, where the one or more refractory materials may be any refractory materials used to form refractory products. Non-limiting examples of such refractory products include magnesia-carbon, alumina-magnesia-carbon, high purity alumina, dolomite, bauxite, alumina-silicon carbide-carbon and others. Next at step 34 a magnetic material is obtained for mixing with the one or more refractory materials. In order to enable sorting after use, the magnetic material is selected such that it maintains magnetic properties after heating between 300 degrees F. and 3500 degrees F.

Figure 3A:
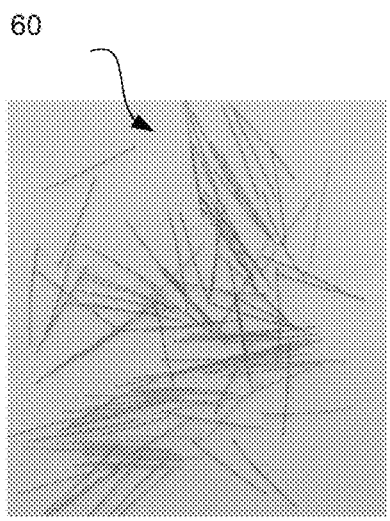
FIGS. 3A-3C illustrate exemplary shapes of magnetic materials that may be added to a refractory component in accordance with the invention.
Figure 3B:
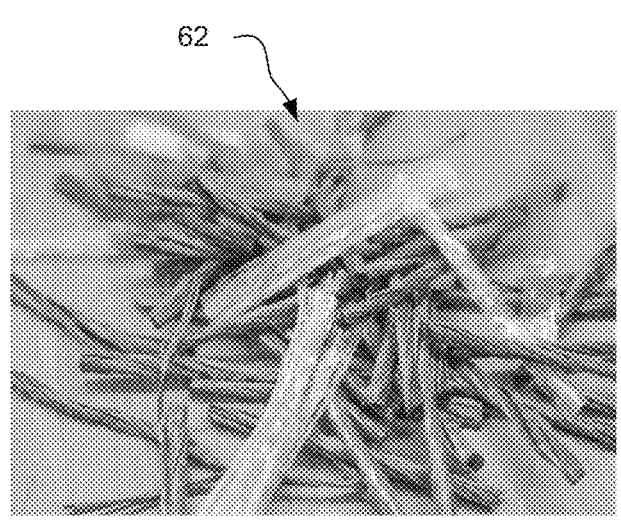
Figure 3C:
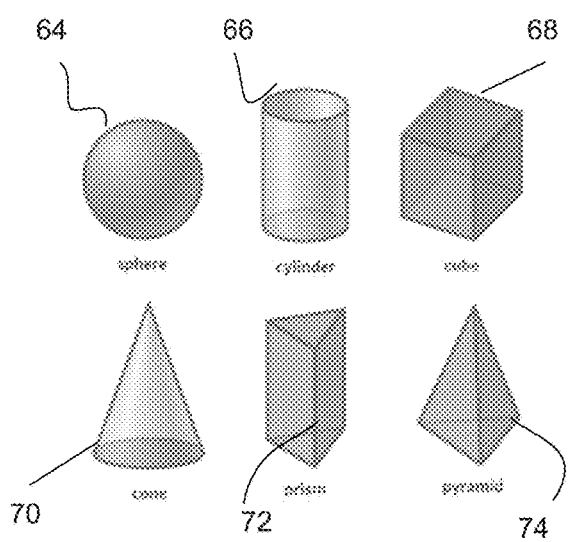
Figure 3D:
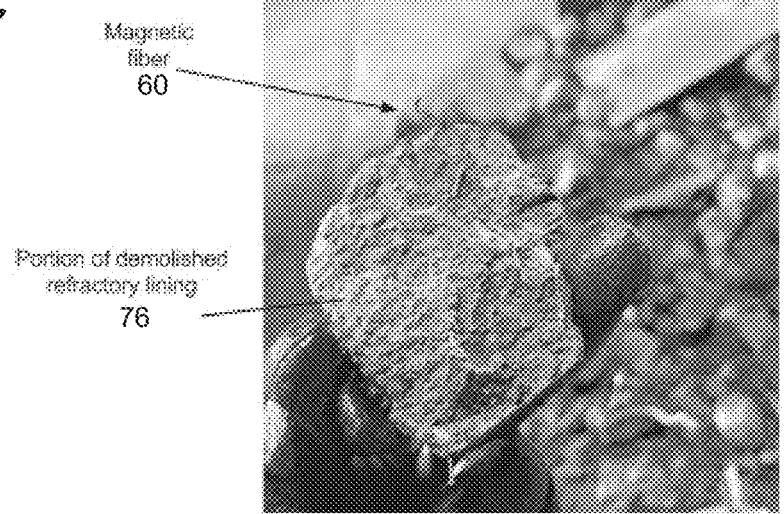
FIG. 3D illustrates a demolished refractory product that include magnetic fibers in accordance with an embodiment of the invention.

The magnetic material can take various forms. For example, and with brief reference to FIGS. 3A-3D, the magnetic material may be in the form of individual fibers 60 (FIG. 3A), strands 62 formed from intertwined fibers (FIG. 3B), and/or objects such as spheres 64, cylinders 66, cubes 68, cones 70, prisms 72, pyramids, 74, etc. (FIG. 3C). Preferably, the magnetic material is smaller than a sphere having a diameter of one quarter inch. FIG. 3D illustrate magnetic fibers 60 extending out from a demolished portion of a refractory lining 76. The magnetic material may comprise one or more of:

magnetic 406 stainless steel;
  ferrite magnets, which may be formed, for example, from BaFe12O19 and SrFe12O19, and are most widely used as permanent magnets due to their excellent temperature resistance, low cost, and moderate performance;
  Iron, Steel, Nickel, Cobalt, Rare Earth Metals (e.g., Gadolinium, Samarium, Neodymium), Ferromagnetic Ceramics (e.g., Ferrite (iron oxide+nickel or zinc), magnetic barium ferrite) may also be used;

AlNiCo magnet, which is an alloy composed of aluminum, nickel, cobalt, iron, and other trace metals, and can readily be made into different sizes and shapes, with good workability and can operate at temperatures up to 600 degrees Celsius;

Neodymium magnet, which is the most commercially available magnet with extremely high magnetic properties (BHmax that is more than 10 times higher than that of ferrite); and SmCo magnets, which are divided into SmCo5 and Sm2Co17 according to their components. Due to the high price of materials, the development is limited. SmCo as a rare earth permanent magnet not only has a high magnetic energy product (14-28MGOe), reliable coercivity, and good temperature characteristics. Compared with NdFeB magnets, samarium cobalt magnet is more suitable for working in the high-temperature environment.

Moving back to FIG. 2, optionally at step 36 a binder material is obtained for binding the one or more refractory materials, and the binder material is mixed with the magnetic material. A binder material may be used, for example, when it is desired to have the one or more refractory materials and magnetic material formed into specific shapes, e.g., bricks, etc. Optionally, the magnetic material may be pre-mixed within the binder material and may be mixed with the refractory material. Examples of suitable binder materials include calcium aluminate cement, colloidal silica, colloidal alumina, colloidal magnesia, other colloidal oxides or hydroxides, hydratable alumina, phenolic resin, pitch, phosphate, starch, sugar or sulfonate. If the one or more refractory materials and magnetic material are to remain unformed, e.g., for use as a refractory concrete for forming a refractory lining component by casting within the refractory vessel, then the binder material may be inactive or omitted and step 36 may be skipped.

At step 38 the magnetic material obtained in step 34, or the optional binder+magnetic material mix obtained in step 36, is mixed with the one or more refractory materials to disperse the magnetic material throughout the resulting refractory product. Preferably, in mixing the magnetic material and refractory material the magnetic material is homogeneously dispersed throughout the resulting refractory product.

If at step 42 it is determined that the mixture of refractory material and magnetic material includes a binder, then the method moves to step 44 where the resulting mixture is formed into a desired shape and cured to form the refractory product. However, if at step 42 the mixture of refractory material and magnetic material does not include a binder, then the method moves to step 46 and the mixture is left in an unshaped form. Accordingly, the resulting mixture may be shaped, unshaped, basic, non-basic, fired, unfired, cured, pressed, casted, etc. to form a refractory product for lining of a refractory.

Figure 4:
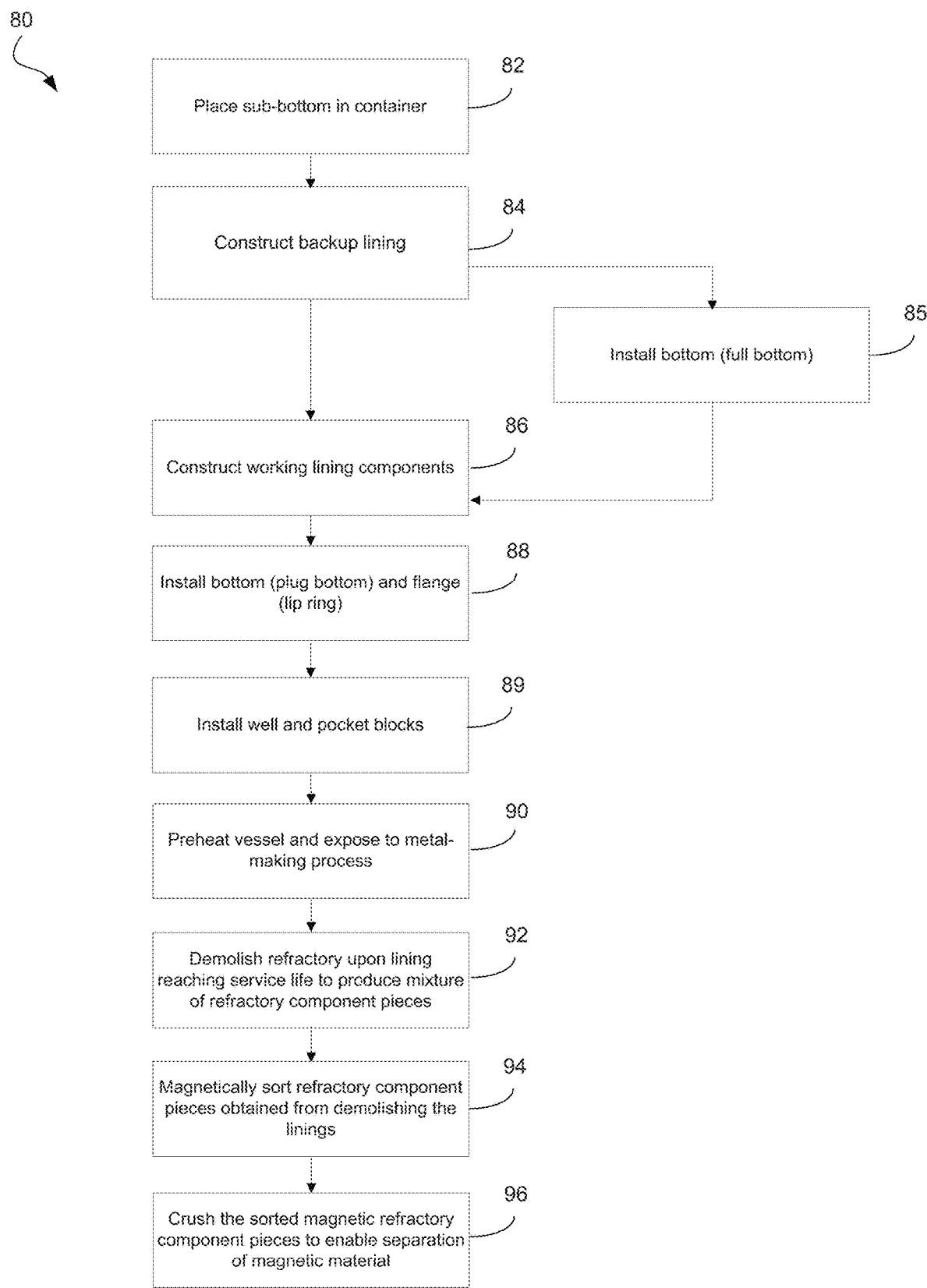
FIG. 4 is a flow chart showing exemplary steps of constructing a refractory lining and reclaiming pieces of spent refractory products from the lining in accordance with the invention.

Referring to FIG. 4, illustrated are steps of an exemplary method 80 for constructing a liner of a refractory vessel (e.g., a Steel ladle, EAF furnace, etc.) using a refractory product in accordance with the invention, and subsequently reclaiming refractory material after the liner has reached the end of its service life. Beginning at step 82, the refractory lining of a steel ladle is assembled by placing a sub-bottom 26 within a container structure 27. Next at step 84, a backup lining 22 is constructed within a steel shell 27 of the refractory vessel to define an outer-most surface of the backup lining 22. If the refractory vessel is to have a full bottom, then at step 85 such full bottom is installed. Then at step 86 a working lining 12 is formed adjacent to the backup lining 22, the working lining 12 defining an inner-most wall 12a of the metallurgical vessel 10. At least one of the backup lining 22, the barrel region 14, the transition region 16, the slag line region 18, the free board region 20, the lip ring 28, the bottom lining 24 or the sub-bottom 26 is formed using the refractory product (which includes a magnetic material) as formed in accordance with the method of FIG. 3.

Next at step 88 the flange (lip ring) 28 is installed over the backup lining 22 and working lining 12, the flange 28 defining a top surface of the vessel. The flange 28 can be formed from Alumina-based castable or ram. Additionally, and assuming the vessel does not have a full bottom, a plug bottom is installed over the sub-bottom 26. After the full or plug bottom is installed, well and pocket blocks are installed as indicated at step 89.

Next at step 90 the assembled refractory lining is placed into service, where the vessel is heated and exposed to a metal-making process, thereby exposing the working lining 12 to high-temperatures. Once the refractory lining has reached a point in which it requires repair or replacement, the refractory lining is prepared for tear out and demolished as indicated at step 92 to produce a mixture of pieces of spent refractory components of different chemistry types (e.g., a mixture of refractory component pieces that were originally formed from different types of refractory products). Preferably, the demolished refractory component pieces are not crushed or, if crushed, the resulting crushed pieces are at least one quarter inch in length, width, height or diameter. Such minimum size ensures sufficient magnetic material remains in the demolished pieces to enable efficient magnetic separation. At step 94 the mixture of different refractory component pieces is subjected to a sorting process whereby the pieces are magnetically sorted into groups, e.g., refractory component pieces that exhibit magnetic properties greater than a predetermined threshold level and refractory component pieces that do not exhibit magnetic properties greater than the predetermined threshold. For example, magnetic properties of the refractory component pieces, in changed or unchanged form, may be utilized to identify the type of refractory product from which the refractory component pieces were formed. In this regard, a magnetic sorter may divert refractory component pieces having magnetic properties into a first bin, and divert refractory component pieces without magnetic properties into a second bin. The sorted refractory component pieces then can be recycled to form new refractory products.

Optionally, the sorted refractory component pieces having magnetic material can be further crushed to liberate the magnetic material from refractory aggregate, as indicated at step 96. In order to liberate the magnetic material from the refractory aggregate or material, the refractory component pieces having magnetic properties are finely crushed and screened using, for example, a −4 mesh screen and after screening, magnetically sorted during secondary magnetic separation, i.e., the screened material is again subjected to a magnetic separation process.

Figure 5:
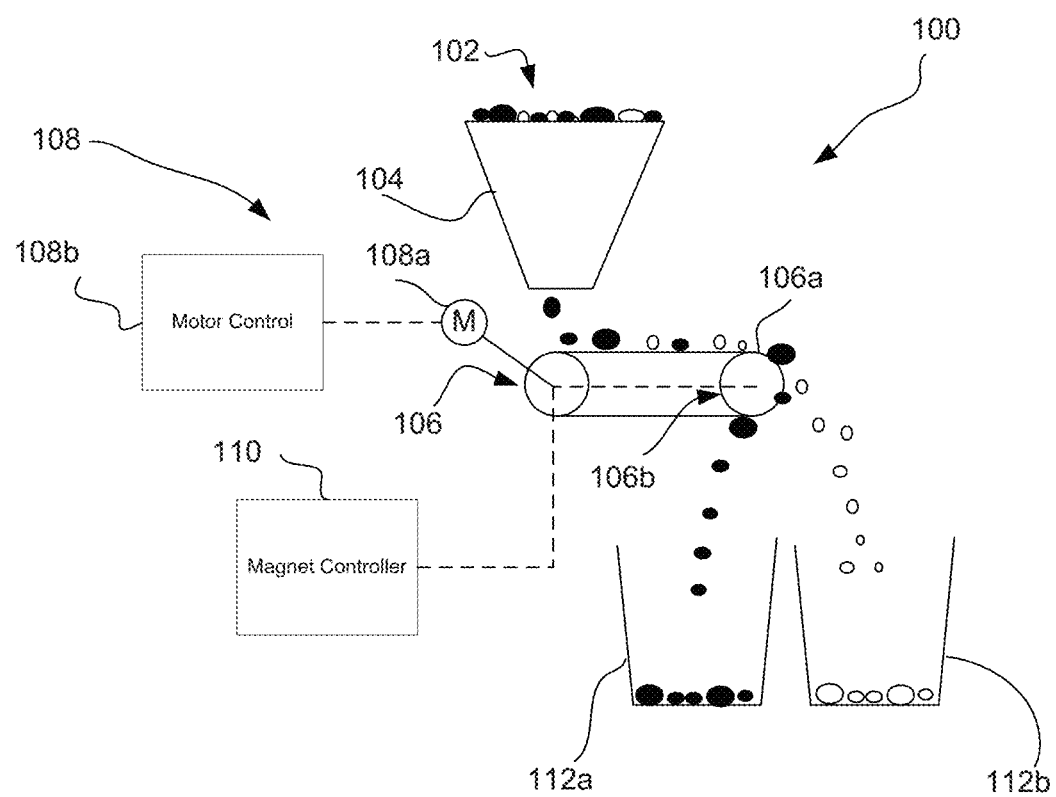
FIG. 5 is a schematic diagram of an exemplary system for sorting a mixture of demolished/crushed pieces of spent refractory products, some that include a magnetic component, in accordance with the invention.

Referring to FIG. 5, illustrated is a simple schematic diagram showing a system 100 for sorting demolished/crushed refractory component pieces based on a magnetic properties of the refractory component pieces. More specifically, a mixture of demolished/crushed refractory component pieces 102 is collected and placed in a hopper 104. From the hopper 104, the mixture of refractory component pieces 102 is deposited on a transport 106, such as a conveyor or the like. The transport 106 includes a drive means 108, such as a motor 108a drivingly coupled to a drum 106a of the transport 106, and associated motor control 108b operatively coupled to the motor 108a, to operate the transport 106 and move the deposited pieces away from the hopper 104. Additionally, at least a portion of the transport 106 is operative to generate a magnetic field, where the generated magnetic field attracts magnetic materials to the transport 106. In the illustrated embodiment, one or both of the drums 106a include an electro-magnetic 106b, which may be arranged on a surface of the drum 106a or in an interior portion of the drum 106a, where the electromagnet 106b is controlled by a magnet controller 110. The magnet controller 110, by varying a current supplied to the electro-magnet, can vary a strength of a magnetic field generated by the electro-magnet in/on the drum 106a.

As the mixture of refractory component pieces 102 approaches the end of the transport 106, refractory component pieces that have magnetic material are retained on the transport 106 by the magnetic field generated on/within the drum 106a and, thus, adhere to the drum 106a. Accordingly, the refractory component pieces with magnetic materials do not fall away from the transport 106 as they approach the end of the transport and instead follow a surface contour of the transport. In this regard, the refractory component pieces with magnetic materials effectively change direction by approximately 180 degrees so as to begin to move back toward the hopper 104 (from the opposite side of the transport 106). Eventually the refractory component pieces with magnetic material move far enough away from the drum 106a such that the magnetic field no longer can retain the lining pieces on the transport, at which point the refractory component pieces with magnetic material fall away from the transport 106 and drop into a first bin 112a arranged at least partially beneath the transport 106. With respect to refractory component pieces that do not have magnetic materials, such pieces would not significantly be influenced by the magnetic field. Therefore, the refractory component pieces without magnetic materials drop of the transport 106 as the respective pieces reach the end of the transport 106 and fall into the second bin 112b. Unlike the first bin 112a, the second bin 112b is not arranged beneath the transport 106 but adjacent to the end of the transport.

While the bins 112a, 112b are shown near and adjacent the transport 106 to capture the respective refractory component pieces, other means of capturing the respective refractory component pieces are possible. For example, ducts, chutes, additional transports, etc. may be arranged relative to the transport 106 to receive the refractory component pieces and direct them to an appropriate sorting location.

The system of FIG. 5 can rapidly sort refractory component pieces based on their magnetic properties. More importantly, the system and method in accordance the invention provide an effective means for sorting magnetic refractory component(s), which traditionally are much more difficult and labor intensive to tear out and sort, from other non-magnetic refractory components, such as MgO—C slagline, to generate for example a low impurity MgO—C reclaim material.

The foregoing description is a specific embodiment of the present invention. It should be appreciated that this embodiment is described for purposes of illustration only, and that numerous alterations and modifications may be practiced by those skilled in the art without departing from the spirit and scope of the invention. It is intended that all such modifications and alterations be included insofar as they come within the scope of the invention as claimed or the equivalents thereof.

What is claimed is:

1. A method of reclaiming refractory material from a working lining of a refractory vessel, comprising:
    assembling a first refractory component of the lining with a first non-magnetic refractory product;
    assembling a second refractory component of the lining with a second refractory product different from the first refractory product, wherein the second refractory product includes magnetic material dispersed therein;
    upon the lining reaching a service life, demolishing the lining to produce a mixture of first refractory component pieces and second refractory component pieces; and
    performing magnetic separation on the mixture to separate the second refractory component pieces from the first refractory component pieces.

2. The method according to claim 1, wherein performing magnetic separation comprises subjecting the mixture to a magnetic field, whereby the magnetic field attracts the magnetic material and causes the second refractory component pieces to be drawn away from the first refractory component pieces.

3. The method according to claim 1, comprising prior to assembling the second refractory component, pre-mixing the magnetic material with a refractory material of the second refractory product.

4. The method according to claim 1, further comprising prior to demolishing the lining, subjecting the lining to a metal-making process.

5. The method according to claim 1, wherein assembling includes using a second refractory product having magnetic material in the form of fibers, needles or spheres.

6. The method according to claim 1, wherein assembling includes using a second refractory product having magnetic material that has a length, width and height less than one quarter inch, or has a diameter less than one quarter inch.

7. The method according to claim 1, wherein assembling includes using a second refractory product having magnetic material configured to retain magnetic properties after exposure to a metallurgical process.

8. The method according to claim 1, wherein assembling includes using a second refractory product having a concentration of magnetic material relative to refractory materials of the second refractory product that is between 1-5 percent by weight.

9. The method according to claim 1, wherein demolishing the lining comprises demolishing the lining to produce first and second refractory component pieces that are greater than one quarter inch in at least one of a length, width, height, or diameter.

10. The method according to claim 1, further comprising subsequent to performing magnetic separation, liberating the magnetic material from refractory aggregate of the second refractory component pieces and subjecting such blend to secondary magnetic separation.

11. The method according to claim 10, wherein liberating includes crushing the second refractory component pieces to a size less than one quarter inch in at least one of a length, width, height, or diameter.

* * * * *